United States Patent [19]
Reidenbach

[11] 3,741,561
[45] June 26, 1973

[54] ROOF BOW APPARATUS
[75] Inventor: Robert B. Reidenbach, Exton, Pa.
[73] Assignee: Gindy Manufacturing Corporation, Downingtown, Pa.
[22] Filed: July 7, 1971
[21] Appl. No.: 160,389

[52] U.S. Cl.......................... 269/43, 269/47, 269/53, 269/54
[51] Int. Cl............................................. B25b 5/16
[58] Field of Search .................. 269/37, 40, 41, 43, 269/47, 53, 54

[56] References Cited
UNITED STATES PATENTS
| | | | |
|---|---|---|---|
| 3,018,098 | 1/1962 | Hunt | 269/53 X |
| 3,199,206 | 8/1965 | Snapp | 269/37 X |
| 2,955,820 | 10/1960 | Berg | 269/54 |

Primary Examiner—Robert C. Riordon
Assistant Examiner—E. F. Desmond
Attorney—Thomas I. Davenport, Edward M. Farrell and William R. Nolte et al.

[57] ABSTRACT

Temporary roof bow apparatus for a trailer comprising first and second resiliently actuatable pin latching mechanisms affixed at opposite ends of a transverse member. Each mechanism includes a tongue member which coacts with a groove portion of a longitudinally extending roof rail of an upstanding sidewall of the trailer. Spring biased latching pin means are engageable in longitudinally spaced apertures in the side roof rail to retain the bow in place thereby positioning the opposed sidewalls of the trailer body in spaced relationship to one another. Upon pretacking a roof skin across the sidewalls at a next assembly station permanent roof bows of longer length are substituted for the temporary roof bows.

4 Claims, 4 Drawing Figures

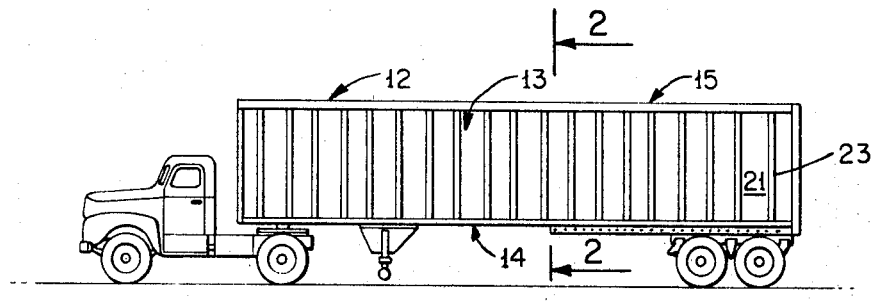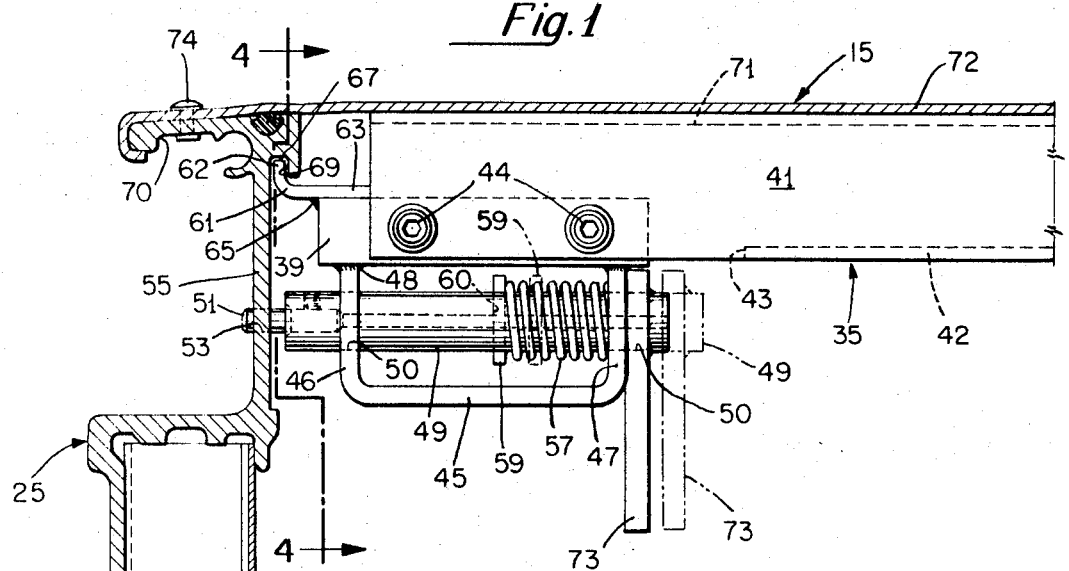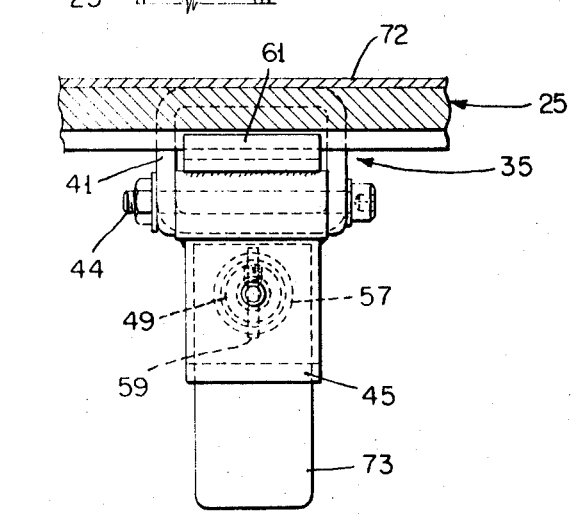

INVENTOR.
ROBERT B. REIDENBACH
BY
William R. Nolte
AGENT

ROOF BOW APPARATUS

This invention relates to temporary roof bow apparatus for a trailer roof construction, and more particularly to a temporary roof bow apparatus which can be quickly assembled and disassembled prior to, and after the roof skin has been stretched between the sidewalls of a trailer.

Heretofore in the prior art construction of trailer roofs, temporary roof bow members have been installed by bolts before stretching a roof skin between the upstanding sidewalls. Thereafter with the roof bows so holding the sidewalls in properly spaced apart and aligned positions, the entire assembly including the floor attached to the lower portions of the sidewall were then lifted to a next assembly station. At this latter station a roof skin was pretacked to the roof rails constituting the upper most structural members of the sidewalls. The temporary roof bows were unbolted sequentially from the roof rails as permanent roof bows of slightly longer dimensions were substituted for the temporary bows. The permanent bows being of longer length than the temporary bows operated to stretch the roof skin progressively along the length of the trailer as the substitution was accomplished. This procedure has proved to be disadvantageous and time consuming because of the difficulty of first aligning the bow members to insert the bolts and thereafter removing the bolts prior to substituting the permanent bows.

It is the principal object of this invention therefore to provide an improved roof bow frame apparatus useful in the assembly of trailer bodies and the like which avoids one or more of the disadvantages of prior art constructions.

It is still another object of this invention to provide an improved roof bow apparatus useful in the construction of trailer bodies and the like which includes a quick connect and disconnect means to enable ready assembly and disassembly from the trailer body structure.

For a better understanding of the invention together with other and further objects thereof, reference is had to the following description taken in connection with the accompanying drawings, wherein, FIG. 1 is a view of a truck trailer combination partly schematic and embodying in its construction the present invention;

FIG. 3 is an enlarged view of one end of the temporary roof bow in locking engagement with a roof rail of one of the sidewalls of the trailer;

FIG. 4 is an end elevational view taken along the lines 4—4 of FIG. 3 illustrating the bow frame latching mechanism.

Figure 2:
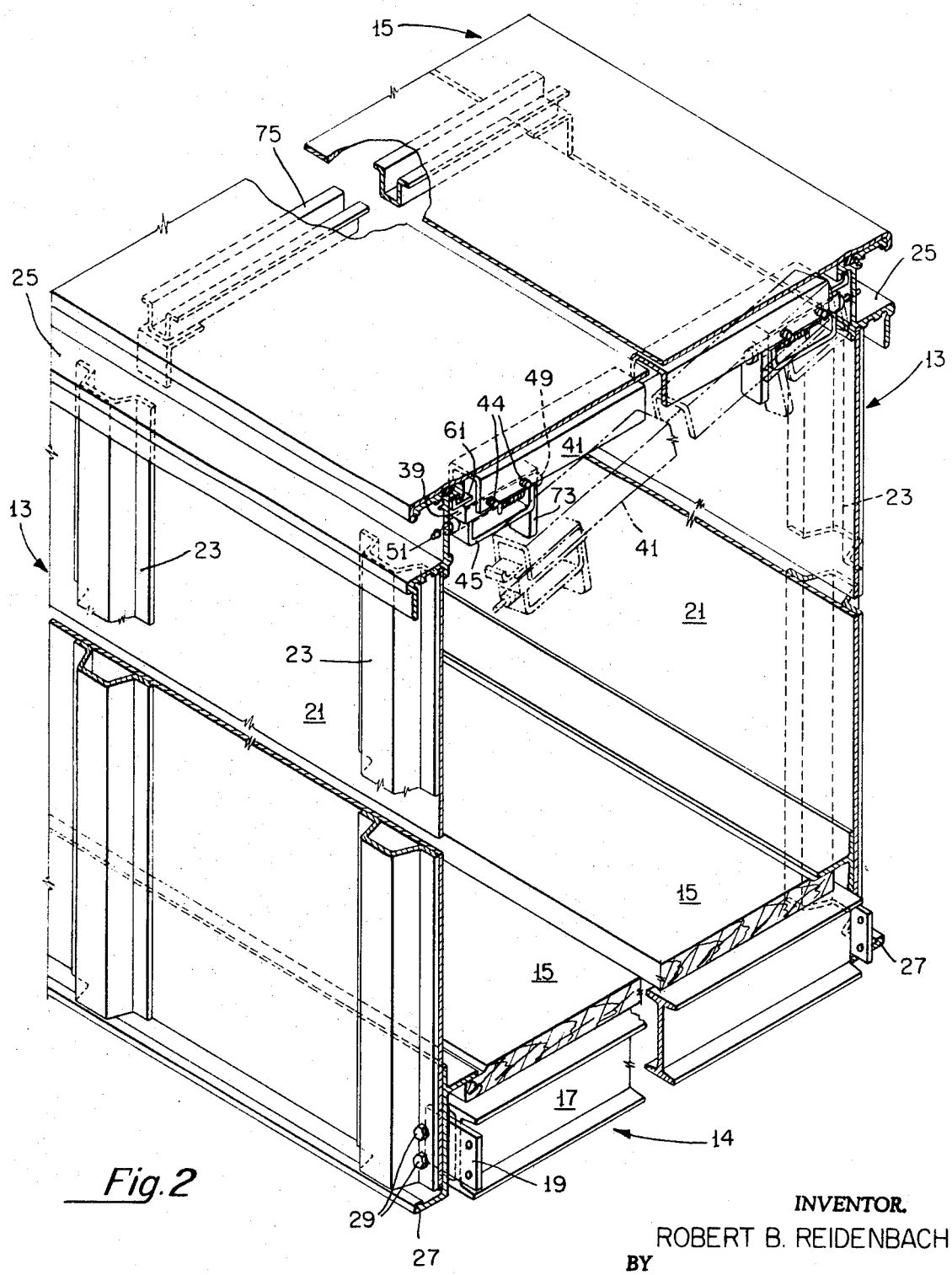
FIG. 2 is a sectional view taken along the lines 2—2 of FIG. 1 illustrating a temporary roof bow in place.

With reference now to FIG. 1 of the drawing there is shown a tractor 10 drawing a trailer 12 which includes sidewalls 13, a floor structure 14 and a roof 15. During the normal course of assembly of the trailer the floor and opposed sidewalls 13 are first sub-assembled as units. The floor, see FIG. 2, is first made up of a plurality of wooden planks 15 arranged longitudinallly and supported on a plurality of transverse cross-sill members 17. The ends of the cross-sill members have clip plate 19 suitably welded to the ends of the cross-sills. The sidewall units 13 include a plurality of skin panels 21 suitably secured to longitudinally spaced vertical posts 23. The posts are hat-shaped and have their flanges extending inwardly toward the interior of the trailer. The sidewalls include an upper roof rail 25 and a lower floor rail 27. The upper and lower rails 25, 27 are suitably fastened to the aforementioned panels 21 and posts 23 by means not shown to form integral unitary sidewalls 13. At a given station in the assembly process the sidewalls 13 are lifted as units and secured to the floor 14 by means of bolts 29 passed through the clips 19 attached to the floor sills.

Prior to moving the above assembled sidewalls and floor 13 and 14 respectively to such next assembly station it is necessary in the production process to tmeporarily hold the opposed roof rails 25 of the sidewalls 13 in the desired spaced apart relationship by applying the roof skin to the roof rails. For this purpose the temporary roof bow apparatus 33 of the present invention is provided. With reference now to FIGS. 2, 3 and 4 the roof bow 33 includes a rigid transverse member 35 having a latching head assembly 37 affixed to each of its opposite ends.

Each latching head assembly 37 includes a central base portion 39 which is engaged between the outer end portions of vertical sidewalls 41 of transverse member 35. The lower wall 42 of said member is notched as at 43 to enable the central base portion 39 of the latching head assembly to be secured therebetween by means of screws 44. A U-shaped loop portion 45 having upright arms 46, 47 is suitably secured to the lower surface of the base as at 48. A slidable shaft 49 of greater length than the U-shaped portion is received in aligned apertures 50 contained within upright arms 46, 47. The outboard end of the shaft includes an axially aligned pilot pin 51 which is normally engageable in apertures 53 disposed in longitudinally spaced relationship along the length of the central vertical web 55 of roof rail 25. A compression coil spring 57 encircling a portion of the shaft 50 opposite pilot pin 53 coacts at one of its ends with upright arm 47 and at its opposite end with spring pin 59 mounted in aperture 60 extending transversely through shaft 50. When the temporary bow frame is normally holding the opposed sidewalls in position, the compression spring 57 is effective to urge the shaft 50 outwardly of the interior of the trailer so that pilot pin 53 passes through aperture 52 of the roof spar. In order to obtain proper spacing between the sidewalls each head assembly includes a clip 61 having a vertical portion 62 and a horizontal portion 63, the latter being suitably welded as at 65 to the top surface of central base portion 39. The upper edge portion 67 of the vertical flange 62 of the clip is shown received within a groove portion 69 formed along the inside under margins of the flange 70 of roof rail 25. The clips 61 in addition to functioning as spacers for the sidewalls, also prevent rotation of the roof bows about the axis of opposed pilot pins 53. The top wall 71 of the transverse member 35 is thus maintained in a flat horizontal position to support the roof skin 72 as the same is uncoiled and disposed blanket fashion between the sidewalls of the trailer.

With reference to FIG. 2 the temporary roof bow 33 is shown movable between its phantom line position to its full line horizontal position. In order to enable assembly and disassembly of the bow frame from its holding position between the sidewalls of the trailer, and its disassembled position to permit installation of a permanent roof frame, FIG. 2, the slidable shaft 50 is provided with a manual gripping portion or handle 73. As seen in FIG. 3 the handle 73 is shown welded to the inboard end of shaft 50 and is further disposed inboard of the vertical arm 47 of U-shaped portion 45 of head 37. Movement of the handle inboard from its full line position to its phantom line moves the pilot pin 51 out of aperture 53 in the roof spar to enable downward movement and withdrawal of the temporary bow to enable substitution of a permanent roof bow.

In normal assembly operations a plurality of the temporary roof bows 35 are first positioned in place along the length of the trailer. Thereafter the previously referred roof skin 72 taken from a coil is spread across blanket fashion to rest on the sidewalls and the top portions 71 of the temporary roof bows. Thereafter the skin is stretched and the top flange and skin are pierced and then pretacked by means of rivets 74. The entire assembly is then moved to a next assembly station and the aforementioned permanent roof bows 75 are positioned in place as the temporary roof bows are removed. The permanent roof bows are of longer length than the temporary bows so that the net result is a stepwise stretching of the roof sheet along the length of the trailer.

While there has been described what is at present considered to be the preferred embodiment of this invention, it will be obvious to those skilled in the art that various changes and modifications may be made therein without departing from the invention, and it is therefore aimed in the appended claims to cover such changes and modifications as fall within the true spirit of this invention.

What is claimed is:

1. A roof bow mechanism to position a pair of opposed sidewalls of a trailer body in laterally spaced relationship to enable a roof skin to be fastened in bridging relationship between said sidewalls, each said sidewall having a groove portion and apertures therein, said mechanism comprising in combination, a rigid transverse member having a surface to support said roof skin, latching head means disposed at each end of said member, said latching head means including a portion which contacts said groove portion along its length, a slidable fastening element in one position of movement thereof mounted for entry in one of said apertures for locking engagement with a corresponding sidewall and movable to anothe position thereof to enable release of said slidable fastening element from said sidewall, and biasing means for normally urging said fastening element into said one position.

2. In the roof bow mechanism as set forth in claim 1 wherein said groove portion in said sidewall extends longitudinally of said trailer body and wherein said portion of said latching head means extends vertically to engage said groove portion.

3. In the roof bow mechanism as set forth in claim 1 wherein said biasing means includes coil spring means encircling said slidable element to normally urge the same into locking engagement with said sidewall.

4- In the roof bow mechanism as set forth in claim 3 and including manually operable means secured to said slidable element to move the same to said another position out of engagement with said sidewall.

* * * * *